United States Patent
Mosek et al.

(10) Patent No.: US 8,839,403 B2
(45) Date of Patent: Sep. 16, 2014

(54) LOCAL PROXY SYSTEM AND METHOD

(75) Inventors: Amir Mosek, Tel Aviv (IL); Alain Nochimowski, Tel Aviv (IL); Micha Rave, Herzliya (IL)

(73) Assignee: SanDisk IL Ltd., Kfar Saba (IL)

( * ) Notice: Subject to any disclaimer, the term of this patent is extended or adjusted under 35 U.S.C. 154(b) by 1661 days.

(21) Appl. No.: 11/967,938

(22) Filed: Dec. 31, 2007

(65) Prior Publication Data
US 2009/0172802 A1    Jul. 2, 2009

(51) Int. Cl.
*H04L 29/06* (2006.01)
*H04L 29/08* (2006.01)

(52) U.S. Cl.
CPC ............ *H04L 67/2819* (2013.01); *H04L 67/28* (2013.01); *H04L 67/2876* (2013.01)
USPC .............. 726/12; 713/168; 713/169; 713/170

(58) Field of Classification Search
CPC .. H04L 67/28; H04L 67/2876; H04L 67/2819
USPC .......................................................... 726/12
See application file for complete search history.

(56) References Cited

U.S. PATENT DOCUMENTS

| | | | |
|---|---|---|---|
| 5,673,322 A * | 9/1997 | Pepe et al. ...................... | 705/52 |
| 5,870,542 A | 2/1999 | Ander et al. | |
| 5,956,509 A * | 9/1999 | Kevner .......................... | 719/330 |
| 6,049,821 A | 4/2000 | Theriault et al. | |
| 6,598,105 B1 * | 7/2003 | Oshins et al. ................. | 710/264 |
| 6,697,850 B1 | 2/2004 | Saunders | |
| 6,718,548 B1 | 4/2004 | Hsiao | |
| 6,775,536 B1 * | 8/2004 | Geiger et al. .................. | 455/411 |
| 6,785,542 B1 | 8/2004 | Blight et al. | |
| 6,907,501 B2 * | 6/2005 | Tariq et al. .................... | 711/118 |
| 7,062,602 B1 * | 6/2006 | Moore et al. .................. | 711/112 |

(Continued)

FOREIGN PATENT DOCUMENTS

| | | |
|---|---|---|
| EP | 1 211 861 | 6/2002 |
| EP | 0 866 590 | 8/2004 |

(Continued)

OTHER PUBLICATIONS

Muller et al., Reliability of three-dimensional ferroelectric capacitor memory-like arrays simultaneously submitted to x-rays and electrical stresses, Nov. 2006, 7th Annual Non-Volatile Memory Technology Symposium, pp. 40-44.*

(Continued)

*Primary Examiner* — Mohammad L Rahman
*Assistant Examiner* — Kenneth Chang
(74) *Attorney, Agent, or Firm* — Toler Law Group, PC (57) ABSTRACT

A local proxy system includes a storage device having a local proxy and a physical port connection. The local proxy is part of a split proxy configuration having a local proxy and a remote proxy. The physical port connection is operative to receive commands from a host via an internet application protocol; and to transmit commands to the host via a modem control protocol, to thereby function as a gateway for conveying these commands to a remote proxy, via the host. Also provided is a method of optimizing communication over a network; and a local proxy system that includes a storage device having a local proxy. The storage device is in connection with a host via a physical port connection complying with a standard storage device interface.

22 Claims, 5 Drawing Sheets

(56) References Cited

U.S. PATENT DOCUMENTS

| | | | |
|---|---|---|---|
| 7,069,451 B1* | 6/2006 | Ginter et al. | 705/51 |
| 7,278,157 B2 | 10/2007 | Jones et al. | |
| 2002/0099829 A1 | 7/2002 | Richards et al. | |
| 2003/0212616 A1* | 11/2003 | Castrogiovanni et al. | 705/30 |
| 2004/0151192 A1* | 8/2004 | Trossen | 370/401 |
| 2004/0152446 A1* | 8/2004 | Saunders et al. | 455/411 |
| 2004/0219905 A1* | 11/2004 | Blumenthal et al. | 455/411 |
| 2005/0004735 A1* | 1/2005 | Kelly et al. | 701/50 |
| 2005/0237967 A1* | 10/2005 | Lee et al. | 370/328 |
| 2005/0240558 A1 | 10/2005 | Gil et al. | |
| 2006/0218409 A1* | 9/2006 | Avraham et al. | 713/189 |
| 2007/0073937 A1* | 3/2007 | Feinberg et al. | 710/62 |
| 2007/0273919 A1* | 11/2007 | Oomura | 358/1.15 |
| 2008/0056214 A1* | 3/2008 | Low et al. | 370/338 |
| 2008/0178203 A1* | 7/2008 | Day et al. | 719/328 |

FOREIGN PATENT DOCUMENTS

| | | |
|---|---|---|
| FR | 2 793 576 | 5/1999 |
| GB | 2 349 546 | 11/2000 |
| GB | 2 350 973 | 12/2000 |
| WO | WO 02/060154 | 8/2002 |
| WO | WO 02/100117 | 12/2002 |
| WO | WO 03/094474 | 11/2003 |

OTHER PUBLICATIONS

Jiang et al., "Web Prefetching in a Mobile Environment," IEEE Personal Communications, IEEE Communications Society, US, vol. 5, No. 5, Oct. 1998.

Kammann et al., "Split-Proxy Concept for Application Layer Handover in Mobile Communication Systems," German Aerospace Center (DLR), Institute of Communications and Navigation, IEEE 2002, pp. 532-536, Sep. 2002.

Strang et al., "Experiences from Ramping Up and Environment for Mobile Information Access," German Aerospace Center (DLR), Oberpfaffenhofen, Germany, Sep. 2004.

International Search Report dated Nov. 22, 2007 from PCT Application No. PCT/IL2007/000644.

Written Opinion dated Nov. 22, 2007 from PCT Application No. PCT/IL2007/000644.

U.S. Appl. No. 60/803,370, filed May 29, 2006.

* cited by examiner

LOCAL PROXY SYSTEM AND METHOD

CROSS REFERENCE TO RELATED APPLICATIONS

This application is related to co-pending U.S. Patent Application Serial Nos. i) Ser. No. 12/029,356 entitled "STORAGE DEVICE HAVING DIRECT USER ACCESS," by Nochimowski et al., filed Feb. 11, 2008; ii) Ser. No. 12/019,573 entitled "DISTRIBUTED STORAGE SERVICE SYSTEMS AND ARCHITECTURE," by Nochimowski et al., filed Jan. 24, 2008; iii) Ser. No. 12/036,440 entitled "CACHE MANAGEMENT" by Nochimowski et al., filed Feb. 25, 2008; iv) Ser. No. 12/045,472 entitled "DIGITAL CONTENT DISTRIBUTION AND CONSUMPTION," by Rave et al., filed Mar. 10, 2008; v) Ser. No. 12/101,065 entitled "STORAGE DEVICE HAVING REMOTE STORAGE ACCESS", by Nochimowski et al., filed Apr. 10, 2008; vi) Ser. No. 12/059,107 entitled "DATA USAGE PROFILING BY LOCAL STORAGE DEVICE," by Nochimowski et al., filed Mar. 31, 2008; vii) Ser. No. 12/123,252 entitled "DATA INDEXING BY LOCAL STORAGE DEVICE," by Nochimowski et al., filed May 19, 2008; and viii) Ser. No. 12/123,304 entitled "DATA INDEXING BY LOCAL STORAGE DEVICE," by Nochimowski et al., filed May 19, 2008, all of which are incorporated by reference for all purposes.

FIELD OF THE INVENTION

The present invention relates to a local proxy system. More particularly, the present invention relates to a local proxy system for optimizing communication over a network.

BACKGROUND OF THE INVENTION

Internet technology is, and has been for years, a rapidly developed field, particularly in the area of network optimization for improving the end-user browsing experience. In computer networks, a proxy server is a server (a computer system or an application program) which services the requests of its clients (e.g. request for a web page, connection establishment, etc.) by forwarding the requests to other servers, typically web servers.

An existing technology for network optimization utilizes a split proxy having two programs—a local proxy and a remote proxy. While the local proxy is connected to a host via a LAN (Local Area Network) connection; the remote proxy communicates with a web server via a WAN (Wide Area Network) connection that is slower than the LAN connection. Since the local proxy and the remote proxy are effectively two parts of the same program, these two proxies can communicate with each other in a more efficient way than they can communicate with a more standard resource or tool, such as a website or browser. This may be ideal for compressing data over a slow link, such as a wireless communication or a WAN (Wide Area Network) communication, as well as for improving the latency. Taking the example of web browsing, the user's browser is pointed to a local proxy, which then communicates with its corresponding remote proxy at some remote location. This remote server fetches the requisite data, repackages the data and sends it back to the user's local proxy. The local proxy then unpacks the data and presents it to the browser in the standard fashion.

Over the years the split proxy has been also used by Mobile Network Operators, thus opening the door for new solutions that will improve the internet browsing experience when using mobile handset devices as well. One common approach trying to overcome the bottleneck scenario when using a mobile handset includes implementing a local proxy as a software application running on the mobile handset in order to reduce the load on the mobile network between the mobile handset and the remote server.

However, since different mobile handsets may run on different operating systems, such implementation typically requires complex software integration. This software integration may prove even more complex when using mobile handsets that run on non-open operating systems.

It is with respect to these and other considerations that the present invention has been made.

SUMMARY OF THE INVENTION

In view of the foregoing observations and the present needs, it would be desirable to have a method of optimizing communication over a network using a local proxy that is executed in a storage device by the storage device controller, the local proxy being part of a split proxy configuration having a local proxy and a remote proxy. The method may be performed by the local proxy receiving commands from a host via an internet application protocol and transmitting commands to the host via a modem control protocol, to thereby convey the commands to the remote proxy, via the host.

An "internet application protocol" may be defined herein to a protocol used over the internet network, by an application. The internet application protocol may be used to receive and transmit commands, to thereby carry information or services. The commands may include any type of requests, such as requests for web content, for processing services, for carrying information, etc. The internet application protocol may include a browsing protocol, such as a HTTP (Hypertext Transfer Protocol), or any other client-server protocol, such as a FTP (File Transfer Protocol) or any other proprietary protocol agreed by both remote entity sides. A "modem control protocol" may be defined as a protocol used by a first device to manage a network communication link, where the network communication link is established by a second device that is operatively coupled to the first device. The second device includes a network interface and may function as a modem to thereby enable the first device to receive and transmit data over this network communication link. As an example, the modem control protocol may be implemented in a configuration having a mobile phone that is operatively coupled to a personal computer (PC). In this example, the personal computer may receive and transmit data over a network link that is established by the mobile phone. Hence, the mobile phone is functioning as a wireless modem to enable the personal computer communication over the network link.

Connection between the storage device and the host may be enabled via a physical link. One way for the storage device to initiate communication may be by raising an interrupt message that is received by the host. Such physical link may be a standard storage wired bus known in the art, including a multi-media memory (MMC) card format bus, a secure digital (SD) memory card format bus and a USB bus, to name a few. The receiving of commands to the local proxy from the host may be performed via a physical link that complies with a standard storage device interface. A "standard storage device interface" may refer herein and in the example embodiments to any memory (or memory card format) standard and specification that is commonly implemented in local storage devices and which defines the physical port connection between the host and the local storage device. A standard storage device interface may typically be used to transfer data in the form of blocks using a logical block addressing (LBA) scheme. The secure digital (SD) memory card format standard and/or the USB standard are non-limiting examples of such a standard storage device interface.

A local proxy may be used herein as an AAA (Authentication, Authorization, and Accounting) server that satisfies the definition of a proxy, and exists within the same administrative domain as the network device that issued the AAA request. Typically, a local proxy will enforce local policies prior to forwarding responses to the network devices, and is generally used to multiplex AAA messages from a large number of network devices. An AAA Server may be used herein a server or servers that provide authentication, authorization and accounting services. It should be appreciated that the process and method described herein may operate on the Internet, Intranet, or a local network over a wired or wireless connection.

Embodiments, various examples of which are discussed herein, include a local proxy that may run on the storage device. Connection between the local proxy and the remote proxy may be enabled by the use of a host functioning as a modem and being in physical link with the storage device. The local proxy may function as a gateway between the storage device and the network, routing web requests to the remote proxy that is in communication link with a web server over a network. The local proxy may be used for collecting information about the available resources currently available to the storage device, and for presenting the appropriate resources to the applications on the storage device. By communicating with the web server over the network (via the remote proxy), the local proxy may function as a middleware between the pulling of web requests from a host, being the client-side; and the pushing of web content and other information to the host from the web server, on the network side.

The storage device may be part of a local proxy system that may be implemented on PDAs (Personal Digital Assistants), mobile handsets, and other various electronic devices. A PDA are typically known as user-held computer systems implemented with various personal information management applications, such as an address book, a daily organizer, and electronic notepads, to name a few.

In one embodiment of the foregoing approach, a method of optimizing communication over a network includes receiving a first set of commands from a host via an internet application protocol; and transmitting a second set of commands from the local proxy to the host via a modem control protocol. The receiving of the first set of commands may be performed by a local proxy running on a storage device. The local proxy may be part of a split proxy configuration having a local proxy and a remote proxy. The transmitting of the second set of commands, by the local proxy, may be performed to thereby convey these second set of commands to the remote proxy, via the host. As most of standard storage devices function as slaves toward the host device and thus may not initialize transactions towards the host (in slave-master architecture the master sends a request to the slave and the slaves only answers). Thus, it important to emphasize herein that the transmitting of a command by the storage device to the host device, where the storage device is a slave, may be done by configuring the storage device to invoke an interrupt signal and notify the host of the data, in this case second set of commands, is to be read from the storage device.

Communication between the storage device and the host may be a physical port connection. The method may also include servicing the first set of commands with the second set of commands, by the local proxy, via the modem control protocol. The method may also include enabling a logical connection between the local proxy and the remote proxy via a host functioning as a modem. The remote proxy is part of the split proxy configuration and being in communication link to a web server via a network. With the remote proxy being in communication link to a web server via a network, the local proxy may be in communication link to the web server via the remote proxy. The method may also include authenticating the remote proxy via the host.

The internet application protocol can be regarded as a protocol used over the internet network, by an application. The internet application protocol may include a browsing protocol, one such browsing protocol being HTTP protocol, or other client-server protocols, e.g. FTP protocol. The modem control protocol may be regarded as a protocol used by a first device to manage a network communication link, where the network communication link is established by a second device that is operatively coupled to the first device. Communication between the storage device and the host may be via a physical port connection complying with a standard storage device interface.

In another embodiment, a local proxy system includes a storage device having a local proxy; and a physical port connection. The local proxy may be operative to run on storage device, the local proxy being part of a split proxy configuration having a local proxy and a remote proxy. The physical port connection may be operative to support a first logical protocol and a second logical protocol. The first logical protocol is used for receiving a first set of commands from a host via an internet application protocol; and the second logical protocol is used to transmit a second set of commands to the host via a modem control protocol, to thereby function as a gateway for conveying these second set of commands to the remote proxy, via the host. The local proxy may service the first set of commands with the second set of commands via the modem control protocol.

The first logical protocol and the second logical protocol may be the same logical protocol. The storage device may be a removable storage device. The internet application protocol may include a browsing protocol, one such browsing protocol being HTTP protocol, or other client-server protocols, e.g. FTP protocol. The storage device may comply with any memory card format, including any one of a secure digital (SD) memory card format, a multimedia card (MMC) format and a compact flash (CF) memory card format; and the host may be compatible with a mobile handset device. With the remote proxy being in communication link to a web server via a network, the local proxy may be in communication link to the web server via the remote proxy. The host may function as a modem to enable a logical connection between the local proxy and the remote proxy. The local proxy may also authenticate the remote proxy via the host.

In another embodiment, a local proxy system includes a storage device having a local proxy; and a physical port connection. The local proxy, being part of a split proxy configuration having a local proxy and a remote proxy, may be operative to run on the storage device. The physical port connection may be operative to provide a first communication link via a first logical protocol and a second communication link via a second logical protocol. The first logical protocol may be used for receiving a first set of commands from a host; and the second logical protocol may be used for transmitting a second set of commands to the host, to thereby function as a gateway for conveying the second set of commands to the remote proxy, via the host. The physical link may comply with a standard storage device interface (i.e. a physical port used with a standard storage device). The local proxy may service the first set of commands with the second set of commands via the modem control protocol.

The first logical protocol and the second logical protocol may be a same logical protocol. The first communication link and the second communication link may be a single communication link. The storage device may be a removable storage device. The storage device may comply with any memory card format, including a secure digital (SD) memory card format, a multi memory card (MMC) memory card format and a compact flash (CF) memory card format. With the remote proxy being in communication link to a web server via a network, the local proxy may be in communication link to the web server via the remote proxy. The host may function as a modem to enable a logical connection between the local proxy and the remote proxy. The host may be compatible with a mobile handset device. The local proxy may further authenticate the remote proxy via the host.

Additional features and advantages of the embodiments described are possible as will become apparent from the following drawings and description.

BRIEF DESCRIPTION OF THE DRAWINGS

For a better understanding of the invention with regard to the various embodiments, reference is made to the accompanying drawings, in which like numerals designate corresponding sections or elements throughout, and in which.

DETAILED DESCRIPTION OF PREFERRED EMBODIMENTS

The embodiments and various aspects thereof will be better understood by referring to the present detailed description of exemplary and preferred embodiments. This description is not intended to limit the scope of claims but instead to provide examples of such embodiments. The following discussion therefore presents exemplary embodiments, which include a local proxy system and a method of optimizing communication over a network.

One embodiment of the local proxy system includes a storage device having a local proxy, running on the storage device, and a physical port connection. The local proxy is part of a split proxy configuration having a local proxy and a remote proxy. The physical port connection may be used, at least partially, to receive a first set of commands from a host via an internet application protocol; and to transmit a second set of commands to a host via a modem control protocol, to thereby function as a gateway for conveying theses second set of commands to the remote proxy, via the host. An internet application protocol is a client-server communication protocol via a web over a network.

A modem control protocol is a protocol used by a first device to manage a network communication link, where the network communication link is established by a second device that is operatively coupled to the first device. The local proxy may service the first set of commands with the second set of commands via the modem control protocol.

Another embodiment of the local proxy system includes a storage device having a local proxy, running on the storage device, and a physical port connection. The local proxy is part of a split proxy configuration. The physical port connection, of this embodiment, provides a first communication link for receiving a first set of commands from a host, and a second communication link for transmitting a second set of commands to a host, to thereby function as a gateway for conveying these second set of commands to the remote proxy, via the host. The communication link, over the physical port connection, complies with a standard storage device interface that is used with storage devices, in general, and with memory cards, in particular. The local proxy may service the first set of commands with the second set of commands via the modem control protocol.

The storage device discussed herein may be compatible with any memory card format, such as a secured digital (SD) memory card format used for storing digital media such as audio, video, or picture files. The storage device may also be compatible with a multi media card (MMC) memory card format, a compact flash (CF) memory card format, a flash PC (e.g., ATA Flash) memory card format, a smart-media memory card format, or with any other industry standard specifications. One supplier of these memory cards is SanDisk Corporation, assignee of this application.

The nonvolatile memory retains its memory or stored state even when power is removed. The storage device may also apply to other erasable programmable memory technologies, including but not-limited to electrically-erasable and programmable read-only memories (EEPROMs), EPROM, MRAM, FRAM ferroelectric and magnetic memories. Note that the storage device configuration does not depend on the type of removable memory, and may be implemented with any type of memory, whether it being a flash memory or another type of memory. The storage device may also be implemented with a one-time programmable (OTP) memory chip and/or with a 3 dimensional memory chip technology.

Host systems with which such memory cards are used include cellular telephones, personal computers, notebook computers, hand held computing devices, cameras, audio reproducing devices, and other electronic devices requiring removable data storage. Flash EEPROM systems are also utilized as bulk mass storage embedded in host systems.

Figure 1:
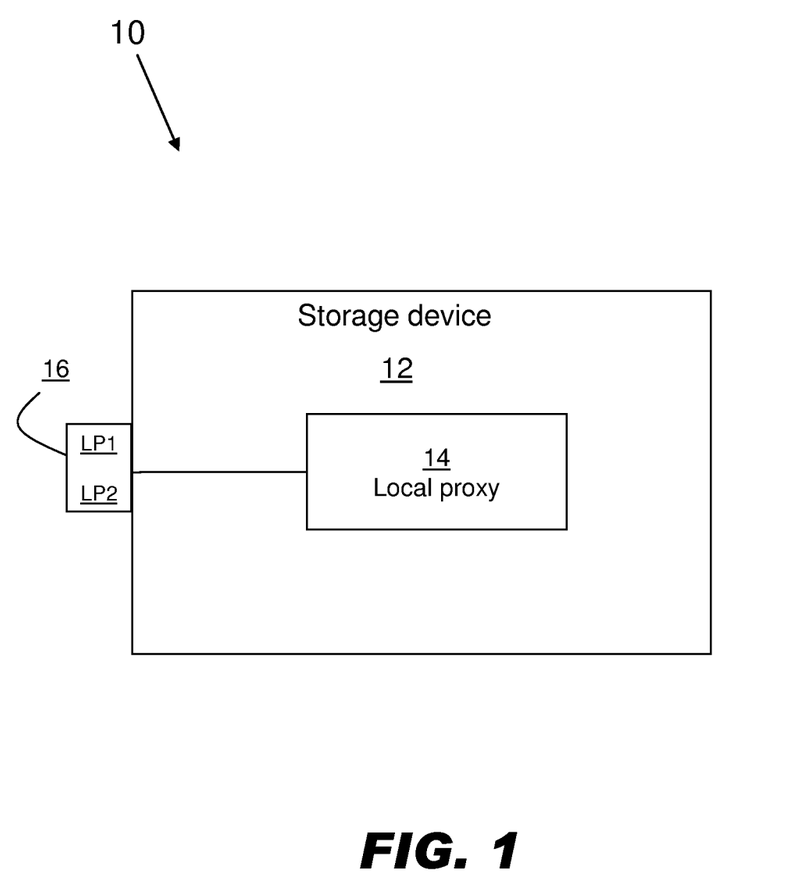
FIG. 1 is a block diagram of a local proxy system, in accordance with one exemplary embodiment.

FIG. 1 is an exemplary block diagram of a local proxy system 10, according to one embodiment. Local proxy system 10 includes a storage device 12. Storage device 10 may be a removable storage device that is to be physically connected to a host. Storage device 12 may comply with any memory and/or any memory card format, including a secure digital (SD) memory card format, a multi memory card (MMC) memory card format and a compact flash (CF) memory card format.

Storage device 12 includes a local proxy 14 and a physical port connection 16. Local proxy 14 is part of a split proxy configuration having a local proxy and a remote proxy. Local proxy 14 is configured to run on storage device 12. One way for implementing this may be using a controller for executing the local proxy on the storage device 12 (see FIG. 2).

The physical port connection 16 may be a wired port connection, complying with a standard storage device interface (e.g. USB port, secure digital memory card format port) that may be used with standard storage devices. Physical port connection 16 is operative to support a first logical protocol LP1 and a second logical protocol LP2, the first logical protocol LP1 used for receiving commands from a host via an internet application protocol, and the second logical protocol LP2 used for transmitting commands to the host via a modem control protocol, to thereby function as a gateway for conveying these commands to the remote proxy, via the host (see FIG. 2). Note that first logical protocol LP1 and second logical protocol LP2 may be the same logical protocol.

The first logic protocol LP1 may emulate an internet application protocol over the physical port connection 16. An internet application protocol may include any type of browsing protocol. One such browsing protocol being, for example, HTTP (Hypertext Transfer Protocol) application protocol that is used for exchanging filed over the WWW (World Wide Web). The internet application may also include other types of client-server protocols, for example, FTP (File Transfer Protocol).

The second logic protocol LP2 may emulate a modem communication link over the physical port connection 16 for initiating the transmissions of commands from the storage device to the host. One way of implementation may include configuring the storage device to invoke an interrupt towards the host over a secure digital (SD) memory card format physical port complying with a standard storage device interface, as defined by the secure digital association in relation to the secure digital input/output (SDIO) standard protocol. An application running on the host, upon receiving the interrupt, may be set to adapt accordingly. For example, the application may switch to read data that is transmitted from the storage device upon receiving an interrupt. As such, storage device 12 typically emulates wireless modem communication over the wired, physical port connection 16.

Figure 2:
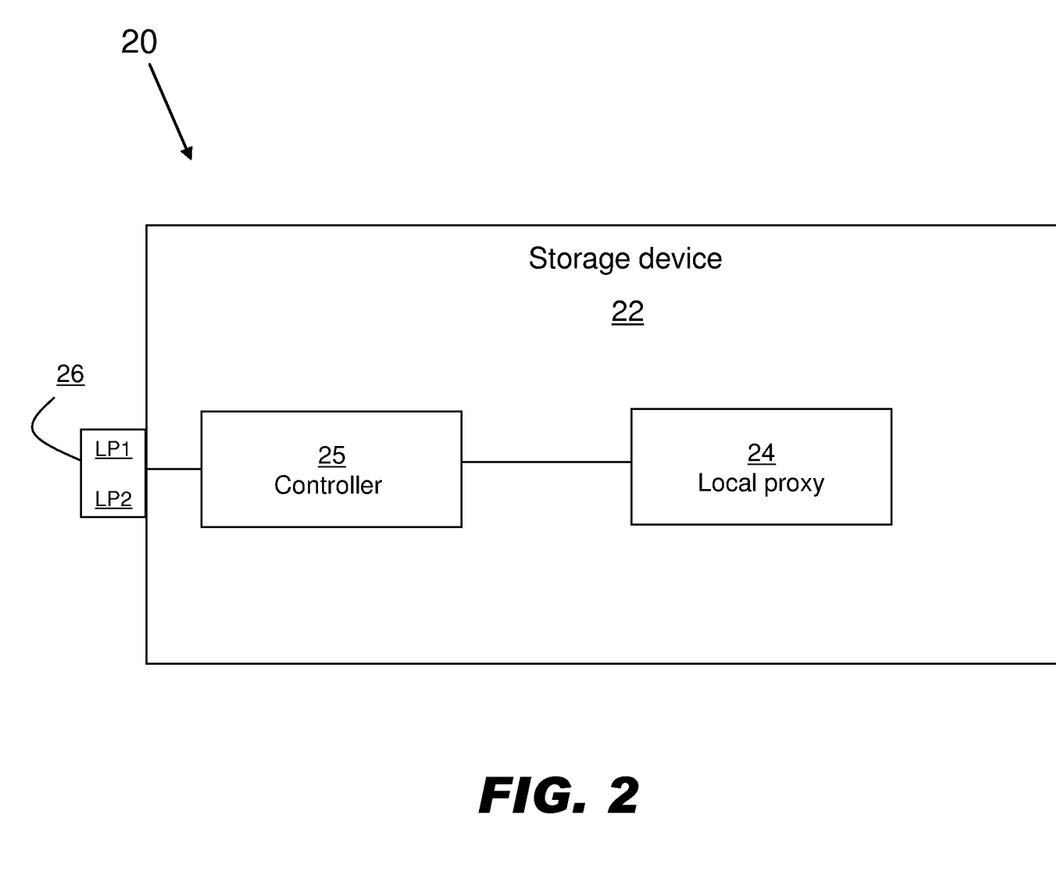
FIG. 2 is a block diagram of a local proxy system, in accordance with another exemplary embodiment.

FIG. 2 is an exemplary block diagram of a local proxy system 20, according to another embodiment. Local proxy system 20 includes a storage device 22 having a local proxy 24 and a physical port connection 26. The local proxy 24 is part of a split proxy configuration having a local proxy and a remote proxy. The local proxy 24 and the physical port connection 26 are operative in a similar manner as their corresponding components in FIG. 1. A controller 25 is provided for executing the local proxy 24 on the storage device 12.

Figure 3:
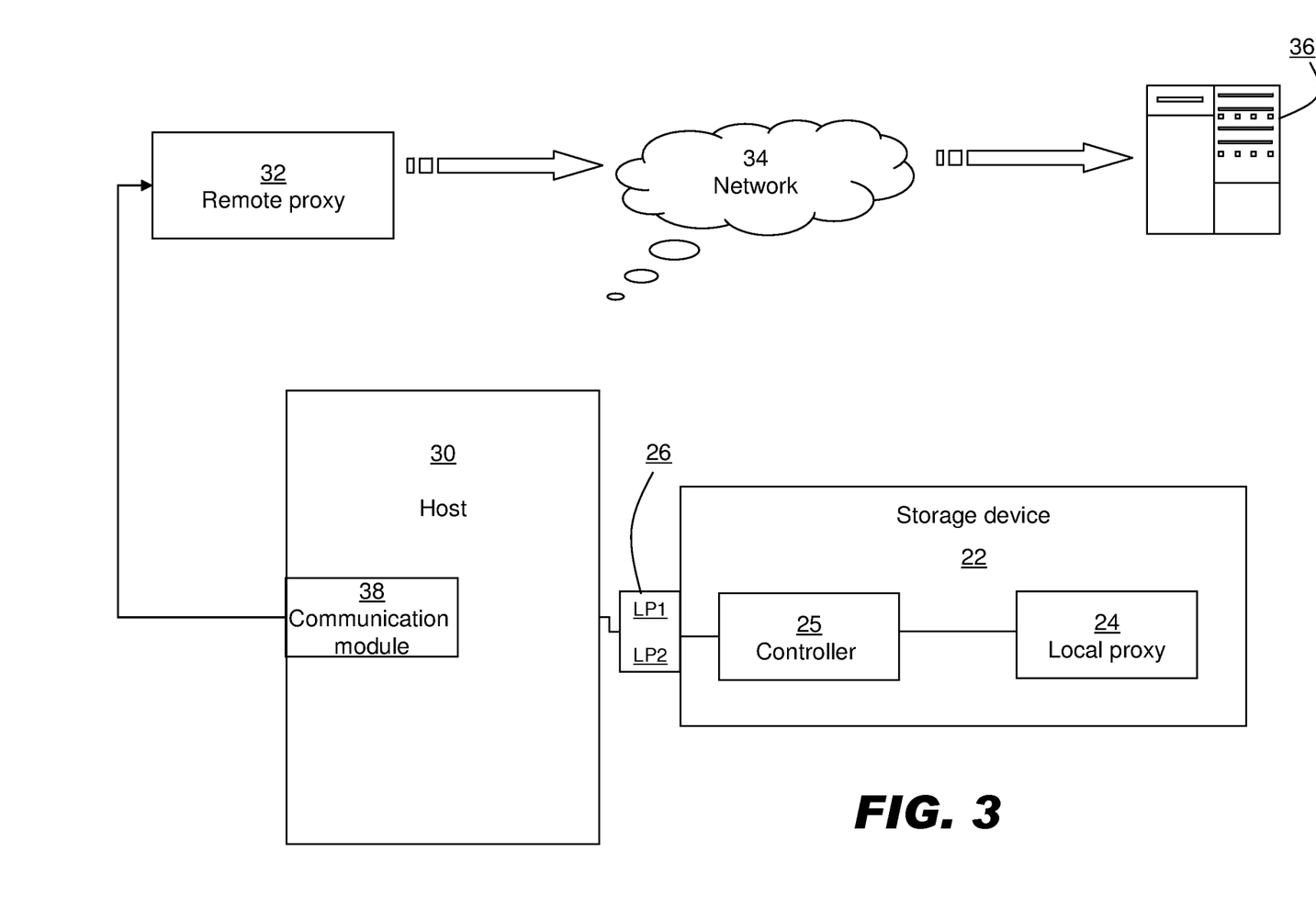
FIG. 3 is a block diagram of the local proxy system of FIG. 2, where the local proxy is in communication to a web server via a remote proxy.

FIG. 3 is an exemplary block diagram of the local proxy system of FIG. 2, where the local proxy is in communication link with a remote proxy 32 via a host 30. Remote proxy 32, which is part of a split proxy configuration, is in communication link with a web server 36 over a network 34. A communication module 38 residing in the host 30 enables a logical connection with a remote proxy 32. With the host 30 communicating with the local proxy 24, the host 30 may function as a modem to enable a logical connection between local proxy 24 and remote proxy 32 via communication module 38. Hence, it should be noted that the logical communication between the local proxy 24 and the remote proxy 32 (and between the local proxy 24 and the web server 36) may be enabled only by the use of the host 30 as a modem. Host 30 may be a mobile device, including any mobile handset device. Local proxy 24 may also authenticate the remote proxy 32 (or may initiate mutual authentication with the remote proxy 32) via the host 30. This may be performed at any point of time, for example, upon initiating communication with the remote proxy via the host to enable routing a web request to the remote proxy.

Figure 4:
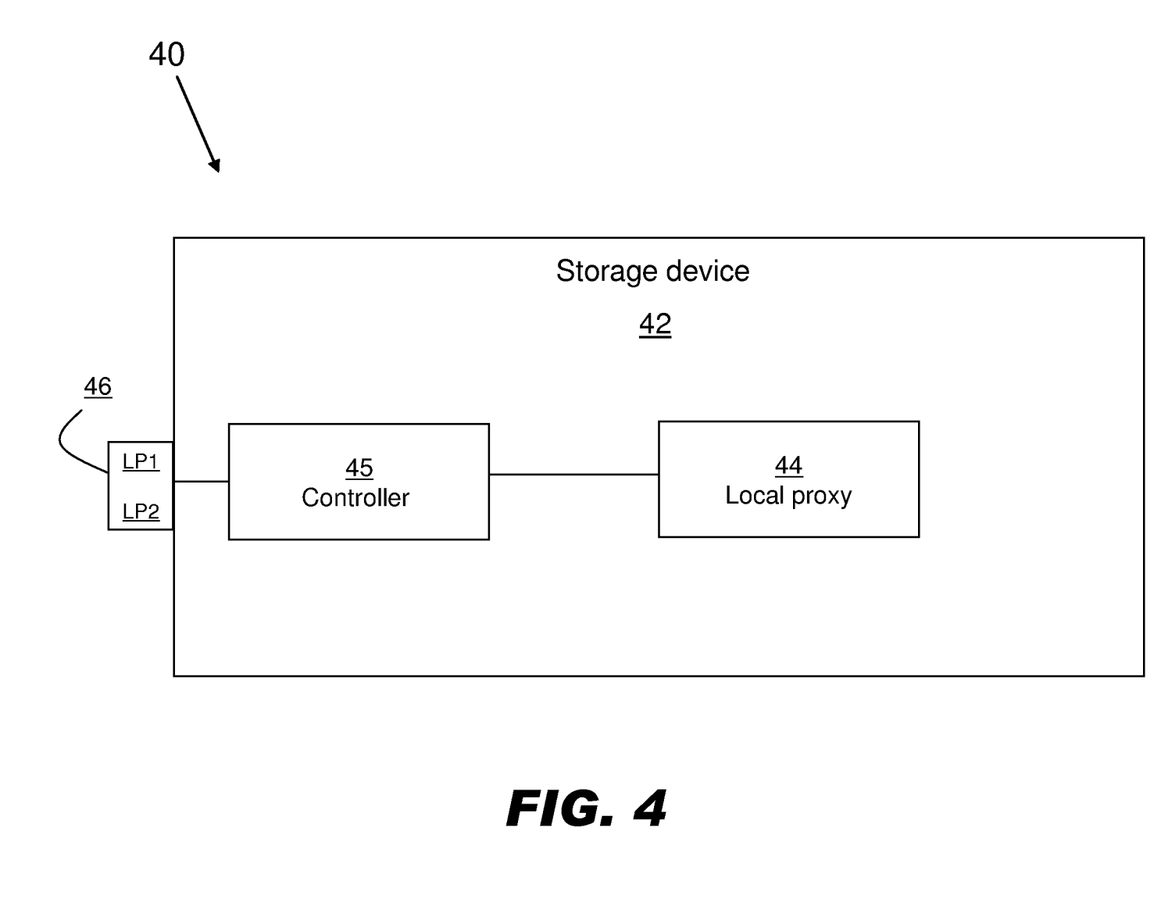
FIG. 4 is a block diagram of a local proxy system, in accordance with another exemplary embodiment.

FIG. 4 is an exemplary block diagram of a local proxy system 40, according to another embodiment. As shown, the local proxy system 40 includes a storage device 42 having a local proxy 44 and a physical port connection 46. The local proxy 44 is part of a split proxy configuration having a local proxy and a remote proxy. When implemented as embedded code stored in the storage device 42, a controller 25 may be provided for executing the code of the local proxy 44.

The physical port connection 46 may be operative to provide a first communication link via a first logical protocol LP1 and a second communication link via a second logical protocol LP2. The first logical protocol LP1 is used for receiving commands from a host. The second logical protocol LP2 is used for receiving commands to the host, to thereby function as a gateway for conveying the second set of commands to the remote proxy, via the host. The physical port connection 46 complies with a standard storage device interface, such as a secure digital (SD) memory card format. Note that first logical protocol LP1 and second logical protocol LP2 may be the same logical protocol.

Storage device 42 may be a removable storage device, and may comply with any memory in general (e.g. flash memory) and with any memory card format (e.g. secure digital, multimedia card and compact-flash memory card formats). In a similar manner to the local memory system of FIGS. 1 and 2, with a remote proxy (of a split proxy configuration) being in communication link to a web server via a network, local proxy 44 is in communication link with the remote proxy via the host. The host, housing the storage device 42 or in physical communication with the storage device 42, may function as a modem to enable a logical connection between the local proxy 44 and the remote proxy. Accordingly, the local proxy may be in a communication link with the remote proxy by the use of the host; and may further authenticate the remote proxy (or initiate mutual authentication with the remote proxy) by the use of the host.

Figure 5:
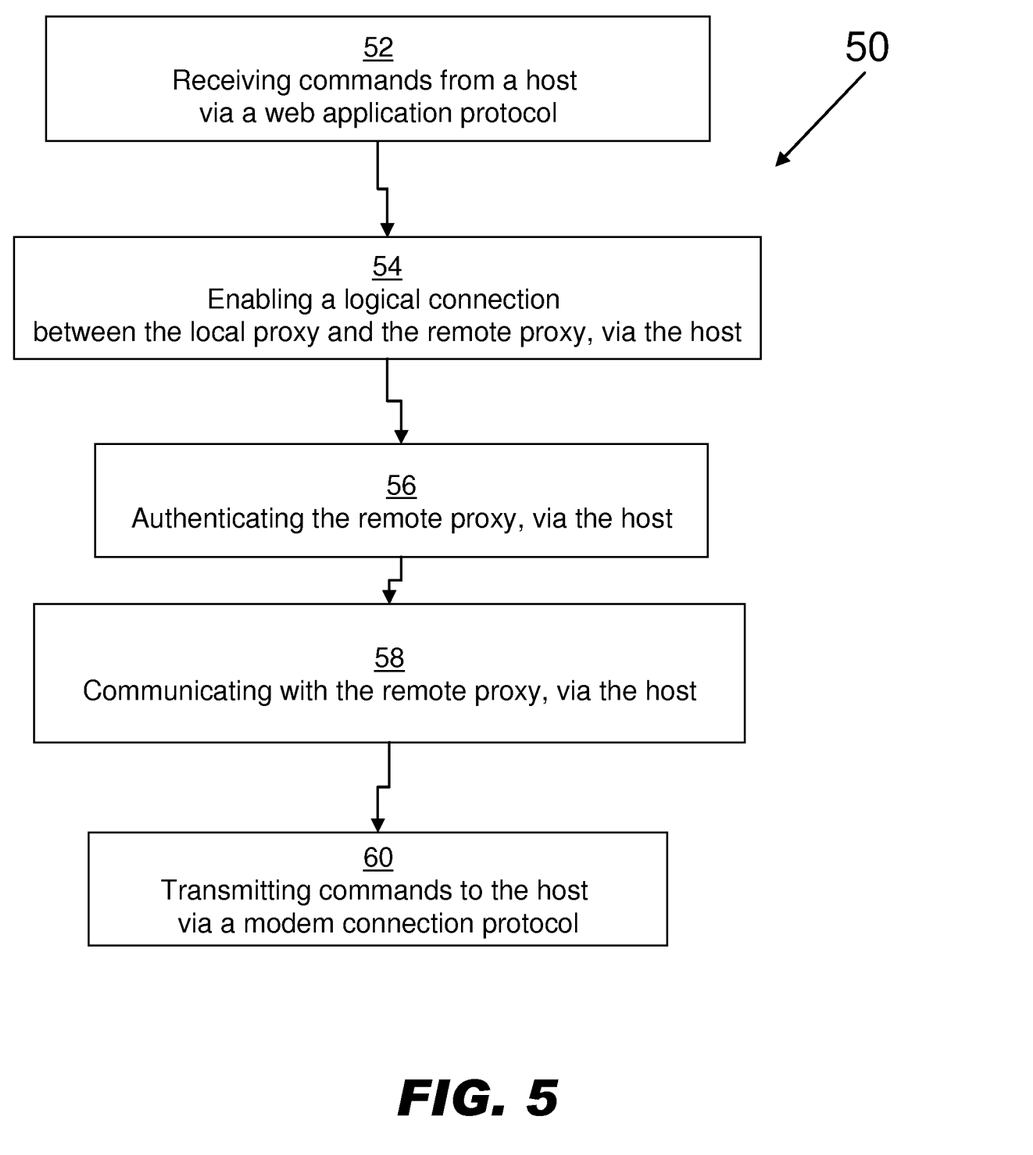
FIG. 5 is a flow chart of a method of optimizing communication over a network, in accordance with an exemplary embodiment.

FIG. 5 is a flow chart of a method 50 of optimizing communication over a network, according to an exemplary embodiment. Method 50 may be performed by a local proxy running on a storage device, the storage device being in a physical port connection with a host. The local proxy is part of a split proxy configuration having a local proxy and a remote proxy.

At 52, a first set of commands are received from a host via an internet application protocol. The commands are communicated over a physical port connection and may include a request for network content, such as a web page, a web site, a file, control code, etc. Internet application protocol may include a browsing protocol, such HTTP protocol, and/or a client-server protocol, such FTP protocol. The local proxy may receive commands via a physical port connection complying with a standard storage device interface (e.g. by emulating an internet application protocol over the standard physical port connection).

At 54, a logical communication is enabled between the local proxy and a remote proxy via a host functioning as a modem. The remote proxy is part of a split proxy configuration and is in communication link to a web server over a network. With the remote proxy being in communication link to the web server via the network, the local proxy is in communication link to the web server as well via the remote proxy (and via the host). Note that the logical communication between the local proxy and the remote proxy, throughout this example, is enabled by the use of a host that houses the storage device, or is in physical communication with the storage device, and that functions as a modem. At 56, the local proxy authenticates the remote proxy via the host. At this step 56, mutual authentication between the local proxy and the remote proxy may be performed via the host.

Next, the local proxy communicated with the remote proxy (58), via the host. This step 58 may be performed by the local proxy routing a web request to the local proxy and receiving the desired content from the remote proxy (typically after the remote proxy accessing the web server and retrieving the desired content).

At 60, a second set of commands are transmitted to the host from the local proxy via a modem control protocol, thereby conveying these commands to the remote proxy, via the host. These commands, which are transmitted from the local proxy to the host, may be used for servicing the first set of commands previously received from the host at step 52. The commands are transmitted over a physical port connection that provided between the storage device and the host. The commands may include the desired web content, web page, control code, or a portion or an indication of the web content, web page, control code, etc. The local proxy may transmit commands via a physical port connection complying with a standard storage device interface. This may be applied by emulating a modem control protocol over a standard storage device interface.

The local proxy may be used for enhancing the apparent connection speed, and may further rely on the retrieval of a cached version of a requested page, or any other content, and the subsequent transmission from the remote proxy to the local proxy of only the differences between the cached version (that is stored on the host) and the current version (existing on the web server). A host—at the user side—may use its relatively fast and cheap computational resources, to reconstruct the current page from the cached version and the received difference data. This may be accomplished in many ways using different computing techniques known in the art.

The embodiments, various examples of which are described herein, may be realized in hardware, software, or a combination of hardware and software. An implementation of the method and local proxy system of the present invention may be realized in a centralized fashion in one computer system; or in a distributed fashion where different elements are spread across several interconnected computer systems. Any kind of computer system, or other apparatus adapted for carrying out the embodiments described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the embodiments described herein, and which, when loaded in a computer system is able to carry out these embodiments.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Having described the various embodiments of systems and a method, it is to be understood that the description is not meant as a limitation, since further modifications will now suggest themselves to those skilled in the art, and it is intended to cover such modifications as fall within the scope of the appended claims.

The invention claimed is:

1. A method comprising:
receiving a first set of commands from a host via an internet application protocol, the receiving being performed by a local proxy comprising middleware loaded on a storage device that includes a three-dimensional (3D) memory and a controller configured to execute the local proxy, the local proxy being part of a split proxy configuration that includes the local proxy and a remote proxy;
enabling a logical connection between the local proxy and the remote proxy via the host, the remote proxy communicatively coupled to a web server via a network;
authenticating the remote proxy, the authenticating being performed by the local proxy via the host, wherein the local proxy is configured to perform an authentication., authorization, and accounting (AAA) service; and
transmitting a second set of commands from the local proxy to the host via a modem control protocol, to thereby convey the second set of commands to the remote proxy via the host,
wherein transferring of commands from the storage device to the host is enabled via a physical port of the storage device, and wherein the physical port complies with a standard storage device interface.

2. The method of claim 1, wherein the local proxy is in communication with the web server via the remote proxy.

3. The method of claim 1, wherein the internet application protocol includes a type of client-server protocol.

4. The method of claim 1, further comprising initiating communications over the physical port by invoking at the storage device an interrupt message that is received by the host.

5. The method of claim 1, further comprising servicing the first set of commands with the second set of commands, the servicing being performed by the local proxy via the modem control protocol.

6. The method of claim 1, wherein the host includes at least one of: a cellular telephone, a camera, a personal digital assistant, and an audio reproducing device.

7. The method of claim 1, wherein the storage device complies with a memory card format including a secure digital (SD) memory card format, a multi memory card (MMC) memory card format and a compact flash (CF) memory card format.

8. The method of claim 1, wherein the storage device is a removable storage device.

9. A storage device comprising:
a local proxy that is part of a split proxy configuration having the local proxy and a remote proxy, wherein the local proxy includes middleware at the storage device, wherein the local proxy is configured to authenticate the remote proxy via a host, wherein the local proxy is configured to perform an authentication, authorization, and accounting (AAA) service, wherein the local proxy is configured to use a logical connection to the remote proxy to communicate with a web server when the remote proxy is communicatively coupled to the web server via a network;
a controller at the storage device configured to manage operation of the local proxy;
a three-dimensional (3D ) memory coupled to the controller; and
a physical port that complies with a standard storage device interface and that is operative to support an internet application protocol to receive a first set of commands from the host and a modem control protocol to transmit a second set of commands to the host, wherein the physical port conveys the second set of commands to the remote proxy via the host.

10. The storage device of claim 9, wherein the internet application protocol and the modem control protocol are the same.

11. The storage device of claim 9, wherein the storage device is a removable storage device.

12. The storage device of claim 9, wherein the internet application protocol includes a client-server protocol.

13. The storage device of claim 9, wherein the storage device complies with a memory card format, including one of a secure digital (SD) memory card format, a multimedia card (MMC) format and a compact flash (CF) memory card format.

14. The storage device of claim 9, wherein the host includes at least one of a cellular telephone, a camera, a personal digital assistant, and an audio reproducing device.

15. The storage device of claim 9, wherein the local proxy services the first set of commands with the second set of commands via the modem control protocol.

16. A storage device comprising:
   a local proxy that is part of a split proxy configuration having the local proxy and a remote proxy, wherein the local proxy is configured to authenticate the remote proxy via a host, wherein the local proxy is configured to perform an authentication, authorization, and accounting (AAA) service, wherein the local proxy is configured to use a logical connection to the remote proxy to communicate with a web server when the remote proxy is communicatively coupled to the web server via a network;
   a controller at the storage device configured to execute the local proxy;
   a three-dimensional (3D) memory coupled to the controller; and
   a physical port that complies with a standard storage device interface and that connects to the host, wherein the physical port is operative to support a first communication link via a first logical protocol and a second communication link via a second logical protocol, wherein the first logical protocol is used to receive a first set of commands from the host and the second logical protocol is used to transmit commands to the host, and wherein the physical port is configured to convey a second set of commands to the remote proxy via the host.

17. The storage device of claim 16, wherein the first logical protocol and the second logical protocol are the same logical protocol.

18. The storage device of claim 16, wherein the first communication link and the second communication link are a single communication link.

19. The storage device of claim 16, wherein the storage device is a removable storage device.

20. The storage device of claim 16, wherein the storage device complies with a memory card format, including a secure digital (SD) memory card format, a multi memory card (MMC) memory card format and a compact flash (CF) memory card format.

21. The storage device of claim 16, wherein the host includes at least one of: a cellular telephone, a camera, a personal digital assistant, and an audio reproducing device.

22. The storage device of claim 16, wherein the local proxy services the first set of commands with the second set of commands via the modem control protocol.

* * * * *